J. N. TIDD.
GATE OPERATING ATTACHMENT.
APPLICATION FILED SEPT. 30, 1915.
Reissued Jan. 25, 1916.
14,055.
2 SHEETS—SHEET 1.
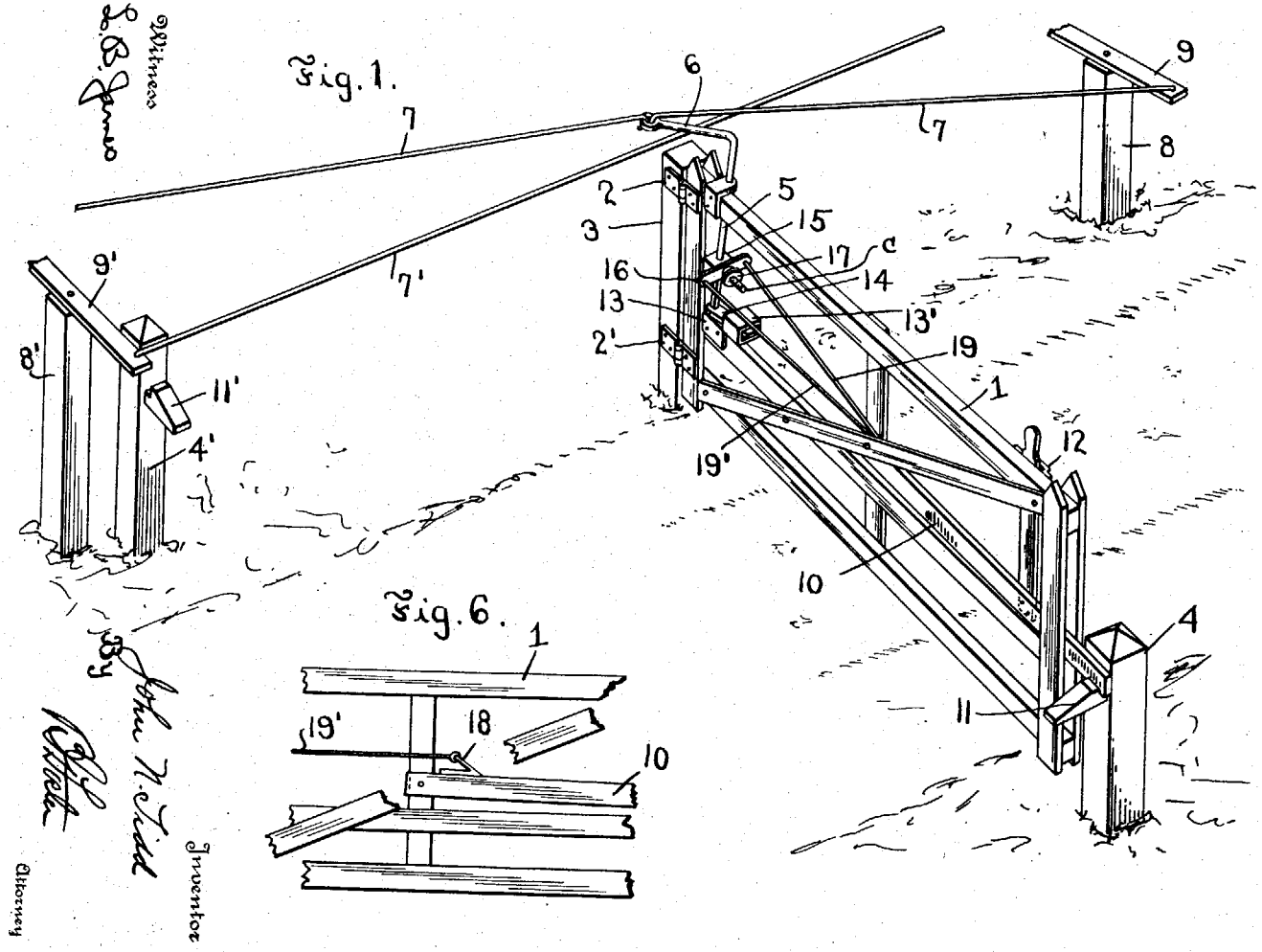
THE COLUMBIA PLANOGRAPH CO., WASHINGTON, D. C.

J. N. TIDD.
GATE OPERATING ATTACHMENT.
APPLICATION FILED SEPT. 30, 1915.
Reissued Jan. 25, 1916.
14,055.
2 SHEETS—SHEET 2.
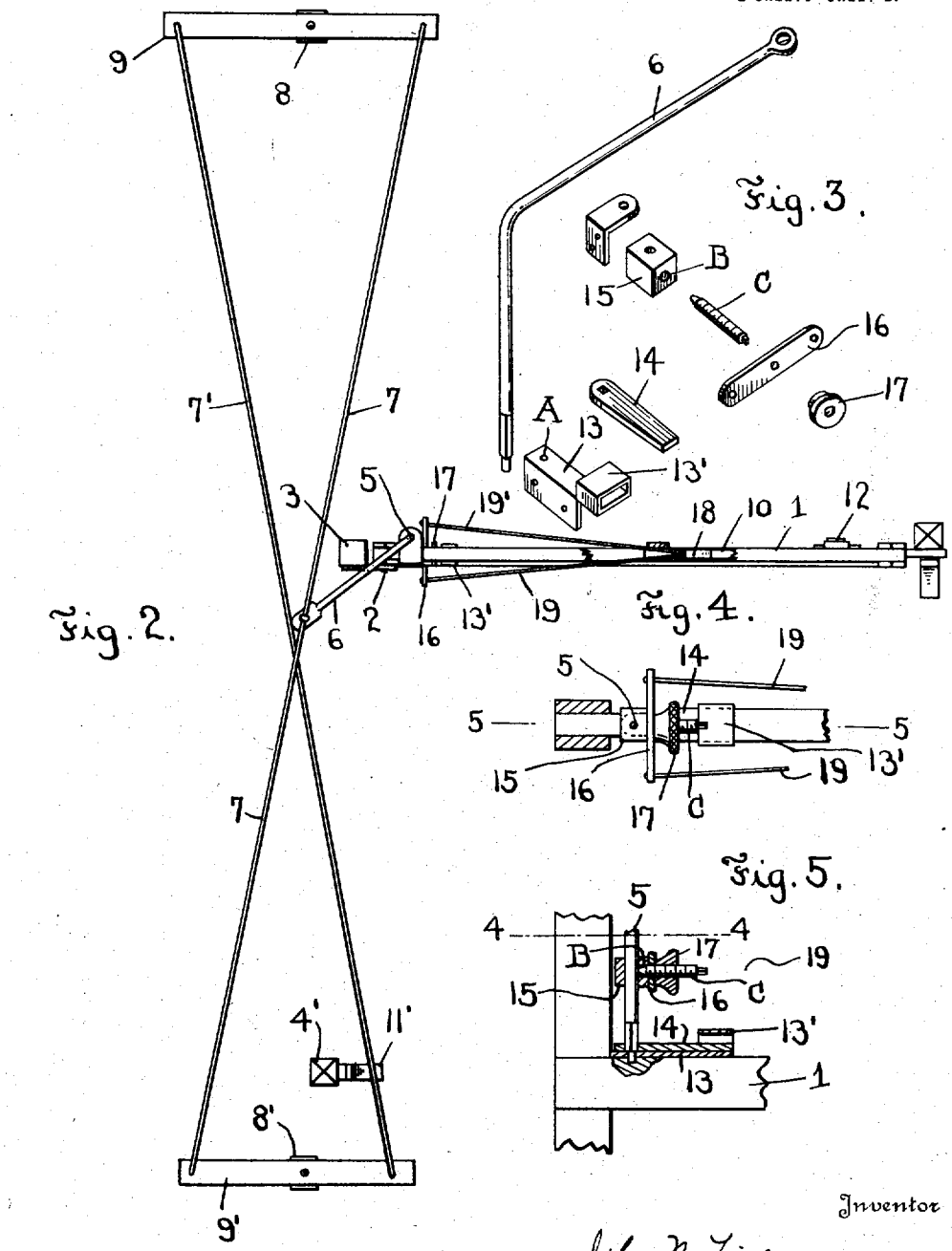
Witness
Geo. B. James
Inventor
John N. Tidd
By
B. Porter
Attorney
THE COLUMBIA PLANOGRAPH CO., WASHINGTON, D. C.

UNITED STATES PATENT OFFICE.

JOHN N. TIDD, OF CARTERS BRIDGE, VIRGINIA.

GATE-OPERATING ATTACHMENT.

14,055. Specification of Reissued Letters Patent. Reissued Jan. 25, 1916.

Original No. 1,134,563, dated April 6, 1915, Serial No. 867,596. Application for reissue filed September 30, 1915. Serial No. 53,457.

*To all whom it may concern:*

Be it known that I, JOHN N. TIDD, a citizen of the United States, residing at Carters Bridge, in the county of Albemarle and State of Virginia, have invented new and useful Improvements in Gate-Operating Attachments, of which the following is a specification.

My invention relates to gates, and pertains more particularly to gates adapted to be opened by persons approaching from a distance without alighting from a vehicle, and which may be closed from a distance after passing on the opposite side.

The object of my invention is to produce a gate-operating device of the class described adapted to be attached to a horizontal gate by which the latch is first disengaged, and the gate then swung open.

Another object thereof is to provide means for latching the gate in open position, and for releasing the latch and closing the gate from a distance after passing through same.

A further object of my invention is to produce a latch and operating device for gates adapted to be conveniently attached to gates of ordinary construction by which same may be operated in either direction, and a still further object of my invention is to produce a more simple, cheap and efficient gate-opening device than has heretofore been attained.

To these ends, my invention includes the combination and arrangement of component parts, to be hereinafter described, and more particularly pointed out in the claims.

In the accompanying drawings, in which like reference characters indicate similar parts, Figure 1 is a perspective view of a swinging gate equipped with my operating attachment; Fig. 2 is a plan view of the same; Fig. 3 is a detail view of my latch and gate operating attachment; Fig. 4 is a horizontal sectional view taken on the line 4—4 of Fig. 5; Fig. 5 is a vertical sectional view of the latch-operating parts of my device, and Fig. 6 is a detail view of the pivoted end of my latch-bar.

Referring now to the drawings, 1 designates a gate pivotally swung on the hinges 2 and 2′ secured on the hinge-post 3, and 4 indicates the latch-post at the opposite end of the gate.

For the purpose of swinging the gate on its hinges, I provide the vertical rod or rock shaft 5, secured upon the gate as hereinafter described, adjacent the hinged end thereof, having the crank arm 6 at its upper end arranged at an angle to the line of the gate, to the outer end of which is attached the wire or rod 7. On the opposite sides of the gate and at a convenient distance beyond the radius thereof, I provide posts 8 and 8′ upon the upper ends of which are pivotally mounted operating levers 9 and 9′ respectively. The ends of said levers are connected by cross wires or rods 7 and 7′, the former being attached intermediate its ends to the crank arm 6, as hereinbefore described.

For the purpose of locking my gate in closed and open positions, I employ the latch bar 10 pivoted at its inner end on the gate adapted to engage the keeper 11 on the latch-post 4 in closed position and the keeper 11′ on the offset latch-post 4′ in open position. Said latch-bar is supplied with a vertical guide 12 intermediate its ends, the weight of which facilitates the prompt locking of the latch and affords a convenient handle for operating the latch by pedestrians.

The means for attaching the rod or rock shaft 5 and crank arm 6 to the gate are so constructed and arranged that they may be readily applied to a gate of ordinary construction without the necessity of providing a specially designed structure. They also comprise adjustable means for raising and disengaging the latch bar from its keeper by the initial movement of the operating levers, the tug of which is not communicated to the gate proper until the latch has been raised and disengaged, and they further provide for ready attachment to gates operating in either direction on the hinges with equal facility, the parts and construction of which I will now proceed to describe.

On the upper face of one of the intermediate horizontal bars of a gate, adjacent to the pivoted end thereof, is rigidly secured a plate 13, adjacent to the inner end of which is provided an orifice A to afford a bearing seat for the lower end of the rod or rock shaft 5. The outer end of said plate is looped to form a keeper 13′ to removably retain the tongue 14 carried on the rod 5. Said looped portion or keeper permits a limited turning motion to the tongue before it contacts with the sides thereof to allow, by such latitude, the latch-operating bar to lift the latch before the gate is swung. The upper portion of the rod or rock shaft 5 is carried in a plate secured to the top rail of the gate, while the lower portion is squared in cross-section and is adapted to fit into a square orifice in the tongue 14 adjacent to its inner end by which the tongue is turned or swung laterally by the crank arm 6. The unattached end of said tongue projects, as shown, into the looped keeper. It will be appreciated that the rod or rock shaft 5 may be placed in said plate in suitable position for operating the gate in either direction from the latch-post.

Intermediate the ends of the vertical rod or rock shaft 5 is adjustably carried a block 15 of metal which is pierced vertically to form a collar to slide on said rod, and is provided with a threaded horizontal bore B to receive the threaded stem C by which the block is held in desired position on the rod. The latch-operating cross bar 16 is mounted on said stem intermediate its ends, and is removably secured thereon by the thumb nut 17. The ends of said cross-bar project laterally and each end is connected with the angle plate 18 secured on the upper edge of the latch-bar 10 intermediate of its pivoted and free ends by the rods or wires 19 and 19′.

In operation, the initial movement of the levers 9 and 9′ actuates the cross-bar 16 and rods 19 and 19′ to raise the latch-bar 10 out of engagement with the keeper on either of the latch-posts, when the tongue 14 engages its keeper 13′ and communicates the action of the levers to swing the gate on its hinges from either an open or closed position; and it will be appreciated that the operating parts of my gate attachment may be readily applied to gates of ordinary and usual construction.

Having thus fully described my invention, what I claim as new, and desire to secure by Letters Patent, is:—

1. The combination with a swinging gate, of a pivoted latch bar therefor, a vertical rod mounted on said gate adjacent to its pivoted end, a crank arm on its upper end, a tongue rigidly carried on said vertical rod adjacent to its lower end, a keeper for said tongue rigidly carried on the gate within which the tongue is loosely carried to afford limited lateral motion, a cross bar adjustably carried on said vertical rod intermediate its ends, connecting rods between the ends of said bar and the pivoted latch bar for releasing the latch bar by the action of the vertical rod within the limits imposed by said keeper, and levers connected with the crank arm offset from the gate for actuating said crank, substantially as described.

2. The combination with a movable gate, of means for normally holding the same against movement, a vertical rod mounted on said gate, a crank arm on the upper end of the rod, a tongue rigidly carried on said vertical rod adjacent to its lower end, a keeper for said tongue rigidly carried on the gate within which the tongue is loosely carried to afford limited lateral motion, a cross bar adjustably carried on said vertical rod between its ends, connecting rods between the ends of said bar and the gate holding means for releasing the latter by the action of the vertical rod within the limits imposed by said keeper, and means connected with the crank arm and offset from the gate for actuating said crank arm.

3. The combination with a vertical rod, of means for mounting the same on a swinging gate adjacent to its pivoted end, a crank arm on the upper end of said rod, a tongue rigidly carried on said vertical rod adjacent to its lower end, a keeper for said tongue within which the tongue has a limited loose play, means for rigidly securing the keeper to the gate, a cross bar adjustably carried on the vertical rod between its ends, means for connecting the ends of said cross bar with the gate holding means for releasing the same by the action of the vertical rod within the limits imposed by the keeper, and means connected with the crank arm for operating the same.

4. As an operating attachment for gates, the combination with a rock shaft, of bearing devices for journaling the same upon a gate, one of said bearing devices including a keeper, a tongue mounted on the rock shaft and having a limited play in the keeper, means on the rock shaft for operating the gate holding means within the limited movement of the rock shaft allowed by the keeper, and means for rotating the rock shaft.

5. As an operating attachment for gates, the combination with a rock shaft, of bearing devices for journaling the same upon the gate, one of said bearing devices including a keeper, a tongue mounted on the rock shaft and adjustable to different fixed positions thereon, said tongue engaging in and having a limited play with respect to the keeper, means on the rock shaft for operating the gate holding means therefrom within the limited movement of said rock shaft allowed by the keeper, and means for rotating the rock shaft.

6. As an operating attachment for gates, the combination with a rock shaft having an offset crank arm at one end, of upper and lower bearing devices for supporting and journaling said rock shaft upon a gate, means for securing said devices to a gate, a keeper formed upon the lower of said bearing devices, said rock shaft having an angular portion adjacent said lower bearing device, a tongue having a socket detachably and adjustably receiving the angular portion of the rock shaft, said tongue engaging and having a limited play in the keeper, a cross bar mounted on the vertical rod, operating devices for the gate holding means connected to the cross bar on opposite sides of the rock shaft, and means for operating the rock shaft connected to the crank arm.

In testimony whereof, I have hereunto set my hand.

JOHN N. TIDD.

Copies of this patent may be obtained for five cents each, by addressing the "Commissioner of Patents, Washington, D. C."